United States Patent
Watkins et al.

(10) Patent No.: US 8,343,894 B2
(45) Date of Patent: Jan. 1, 2013

(54) CONTROLLED VARIABLE DENSITY FLUID FOR WELLBORE OPERATIONS

(75) Inventors: Larry A. Watkins, Houston, TX (US); Roger W. Fincher, Conroe, TX (US)

(73) Assignee: Baker Hughes Incorporated, Houston, TX (US)

(*) Notice: Subject to any disclaimer, the term of this patent is extended or adjusted under 35 U.S.C. 154(b) by 784 days.

(21) Appl. No.: 12/353,587

(22) Filed: Jan. 14, 2009

(65) Prior Publication Data
US 2009/0114450 A1 May 7, 2009

Related U.S. Application Data

(62) Division of application No. 11/155,172, filed on Jun. 17, 2005, now abandoned.

(60) Provisional application No. 60/582,687, filed on Jun. 24, 2004.

(51) Int. Cl.
*B01F 17/00* (2006.01)

(52) U.S. Cl. ............ 507/102; 166/305.1; 507/219; 507/270; 428/402; 264/15; 264/41

(58) Field of Classification Search ............ 507/102, 507/219, 270; 166/305.1; 428/402; 264/15, 264/41
See application file for complete search history.

(56) References Cited

U.S. PATENT DOCUMENTS

| | | | |
|---|---|---|---|
| 3,003,554 A | 10/1961 | Craig et al. | |
| 3,625,892 A | 12/1971 | Watanabe | |
| 3,661,208 A | 5/1972 | Scott et al. | |
| 5,259,453 A | 11/1993 | Johnston | |
| 5,368,412 A | 11/1994 | Johnston et al. | |
| 6,059,034 A * | 5/2000 | Rickards et al. | 166/280.2 |
| 6,508,305 B1 * | 1/2003 | Brannon et al. | 166/293 |
| 6,739,408 B2 | 5/2004 | Rowden | |
| 6,832,650 B2 * | 12/2004 | Nguyen et al. | 166/279 |
| 2004/0040706 A1 | 3/2004 | Hossaini et al. | |
| 2004/0040708 A1 * | 3/2004 | Stephenson et al. | 166/280.1 |
| 2004/0171499 A1 | 9/2004 | Ravi et al. | |
| 2005/0113262 A1 | 5/2005 | Ravi et al. | |
| 2007/0027036 A1 | 2/2007 | Polizzotti et al. | |

FOREIGN PATENT DOCUMENTS

| | | |
|---|---|---|
| CA | 2466549 A1 | 11/2004 |
| WO | 00/05323 A1 | 2/2000 |
| WO | 00/47691 A1 | 8/2000 |

* cited by examiner

*Primary Examiner* — Alicia Toscano
(74) *Attorney, Agent, or Firm* — Mossman Kumar & Tyler PC

(57) ABSTRACT

Fluid systems may contain elements to provide changes in bulk fluid density in response to various environmental conditions. One environmental driver to the variable density is pressure; other environmental drivers include, but are not limited to, temperature or changes in chemistry. The variable density of the fluid is beneficial for controlling sub-surface pressures within desirable pore pressure and fracture gradient envelopes. The variability of fluid density permits construction and operation of a wellbore with much longer hole sections than when using conventional single gradient fluids.

8 Claims, 4 Drawing Sheets

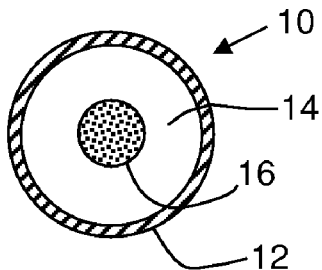
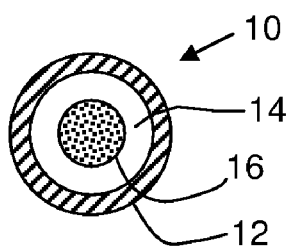
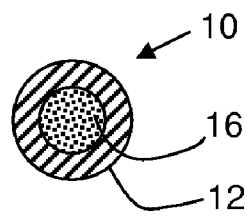
FIG. 1A     FIG. 1B     FIG. 1C
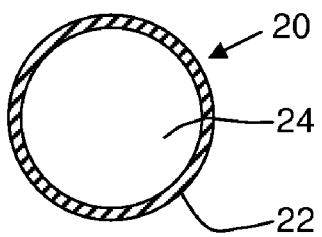
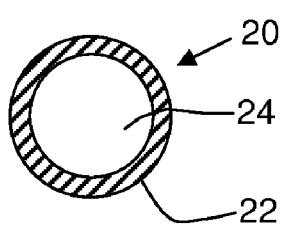
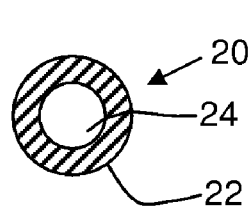
FIG. 2A     FIG. 2B     FIG. 2C
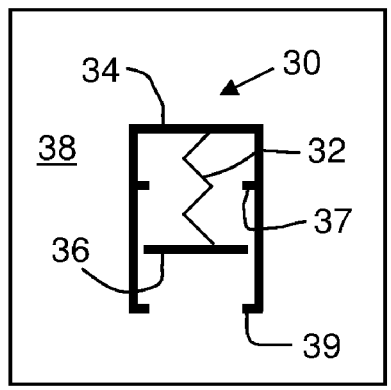
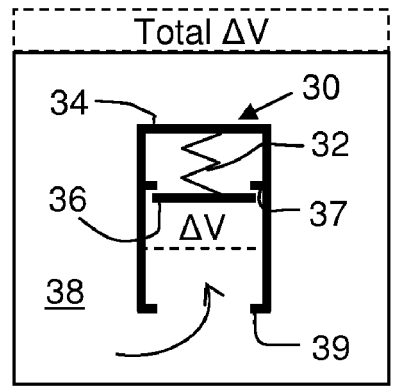
FIG. 3A     FIG. 3B

CONTROLLED VARIABLE DENSITY FLUID FOR WELLBORE OPERATIONS

CROSS-REFERENCE TO RELATED APPLICATIONS

This application is a divisional from U.S. patent application Ser. No. 11/155,172 filed Jun. 17, 2005, which in turn claims the benefit of U.S. provisional application No. 60/582,687 filed Jun. 24, 2004.

TECHNICAL FIELD

The present invention relates to wellbore operations fluids, and more particularly relates, in one embodiment, to wellbore operations fluids having variable density.

BACKGROUND

Prior variable density drilling fluids primarily concerned the use of a highly compressible gas (e.g. air or nitrogen) as a free phase in the fluid. Limited, if any, efforts are made during conventional air, mist or foam drilling to control the expandability of the bulk fluid or to adjust or engineer the compressibility of the fluid other than managing the ratio of air or other gas to the fluid. Other proposals to employ a virtual multiple gradient fluid include so-called dual gradient drilling. This method would use two columns of different density fluids. One column would be essentially static, while the second fluid density is circulated below the seafloor. During drilling the vertical height of the in well bore column would change as the well is deepened and the resulting bulk average fluid density along the wellbore would thus vary with depth.

Typical "single gradient" fluids used today include multiple components (base fluid, various solids and additives). The density of the base fluids is known to vary with temperature and to some degree with pressure. While these density changes are often accounted for during the mathematical modeling of the fluid pressures in the wellbore, the density changes resulting from this behavior is not sufficient to change the design of the wellbore with respect to pore and fracture pressure profiles, as well as position and number of casing strings. No effort is known to be made to intentionally modify the compressibility (density) of classic drilling fluids.

Thus, it is desirable if a true variable density fluid were devised where the properties of the fluid could be designed to fit the requirements of the wellbore operation and the subterranean formations being drilled. It would also be desirable if a variable density fluid composition could be devised that is recirculatable on the current well and/or reused on a second or subsequent well.

SUMMARY

Accordingly, it is an object of the present invention to provide variable density fluid for wellbore operations.

It is another object of the present invention to provide a method of drilling a wellbore using a variable density fluid where the density of the fluid changes by design as a function of external parameters that vary along the depth or length of the well.

Still another object of the invention is to provide a method of drilling a wellbore with a reusable, variable density fluid that permits construction and operation of a wellbore with longer hole sections than when using conventional single gradient fluids.

In carrying out these and other objects of the invention, there is provided, in one form, a method for a fluid of variable density that includes a base fluid and a plurality of elements that change their volume/weight ratio in response to a condition of pressure, temperature, and/or chemical composition of the base fluid. The variable density fluids of the invention have unit densities that can be deliberately changed as contrasted with existing fluids where the bulk fluid density changes only slightly in response to temperature and/or pressure.

There is further provided in another non-limiting embodiment of the invention a method of constructing a wellbore that includes drilling a wellbore using a wellbore operation fluid within the wellbore. The wellbore operation fluid is subjected to a condition, where the density of the fluid changes in response to a condition such as pressure, temperature, and/or chemical composition of the base fluid. The fluid includes a base fluid, and a plurality of elements that change their volume/weight ratio in response to the condition.

There is additionally provided a method of improving the lift of a produced fluid that involves injecting into the produced fluid at a subsurface point an effective amount of a plurality of elements that change their volume/weight ratio in response to a condition that may be pressure, temperature, and/or chemical composition of the produced fluid to increase the lift thereof.

There is also provided an element that changes its volume/weight ratio in response to a condition that includes a non-deformable core, a compliant skin surrounding the core, and at least one gas-filled space between the non-deformable core and the compliant skin, where the condition includes pressure, temperature, and/or chemical composition of the base fluid.

Additionally provided in another non-limiting embodiment of the invention is an element that changes its volume/weight ratio in response to a condition, where the element includes a non-deformable pseudo-porous body; and at least one closed cell compliant component, where the condition includes pressure, temperature, and/or chemical composition of the base fluid.

Still further provided is a non-limiting embodiment that involves a hollow rigid external shell having at least one cavity therein and at least one opening into the cavity and an inner material within the cavity that changes its volume/weight ratio in response to a condition, where the condition includes pressure, temperature, and/or chemical composition of the base fluid.

BRIEF DESCRIPTION OF THE DRAWINGS

FIGS. 1A-1C are schematic, cross-sectional illustrations of various states of an element of one embodiment of the invention, where FIG. 1A is an element of the variable density wellbore operation fluid in its fully expanded state of the largest volume/weight ratio, FIG. 1B is the element of FIG. 1A in an intermediate state, and FIG. 1C is the element of FIGS. 1A and 1B in its fully contracted state of the smallest volume/weight ratio;

FIGS. 2A-2C are schematic, cross-sectional illustrations of various states of another non-limiting embodiment of an element of the invention, where FIG. 2A is an element of the variable density wellbore operation fluid in its fully expanded state of the largest volume/weight ratio, FIG. 2B is the element of FIG. 2A in an intermediate state, and FIG. 2C is the element of FIGS. 2A and 2B in its fully contracted state of the smallest volume/weight ratio;

FIG. 3A is a schematic, cross-sectional illustration of an alternate embodiment of the invention showing a different element in an intermediate state between full expansion and full contraction;

FIG. 3B is a schematic, cross-sectional illustration of the alternate embodiment of the invention of FIG. 3A illustrating the element in a state of full or complete contraction;

Figure 4A:
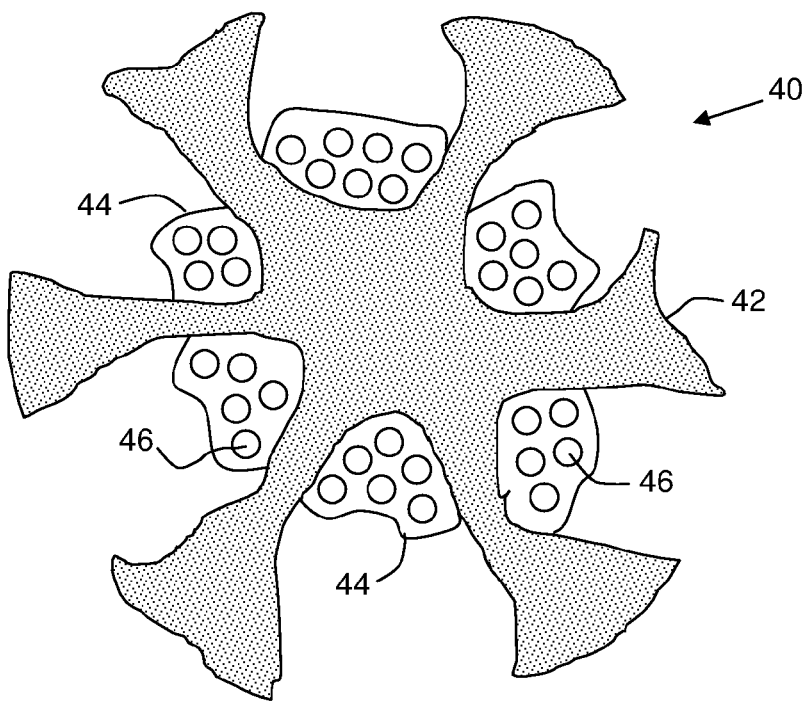
FIG. 4A is a schematic, cross-sectional illustration of yet another non-limiting embodiment of the invention showing a pseudoporous particle (e.g. carbide) with volumes of a cellular elastomer in a relatively contracted state.

It will be appreciated that the drawings are schematic illustrations and are not necessarily to scale, and are employed to further illuminate the invention which is not limited to the particular, specific embodiments shown.

DETAILED DESCRIPTION

During the drilling of a wellbore, fluids are used to control the pressure of exposed formations. Fluid pressures developed must be sufficiently high to prevent flow of formation pore fluids into the wellbore while also be sufficiently low to prevent fracturing or lost returns to formations elsewhere in the open hole section. This process is referred to as staying within the pore-frac window. A consequence of efforts to stay within the pore-frac window is the setting and cementing of strings of casing or liner. That is, the conventional solution to staying within the pore-frac window is to set and cement pipe and then change the mud weight in the next section of the borehole. Alternative solutions encompass, but are not necessarily limited to, extending or pushing the open hole length to and beyond a "safe" limit prior to setting and cementing pipe, including temporary strengthening or lining of the hole and intentional plugging of any potential flow zones. These last two concepts seek to function or perform as partial or temporary linings.

An alternative to efforts to modify or change the wellbore strength and/or fluid pressure communication is to change the profile of the hydrostatic pressure developed by the fluid column so as to stay with the pore-frac window and allow longer hole sections. In general, two methods are currently proposed in which the goal is to develop a substantially variable fluid gradient along the length of the open hole section. The two methods involve the use of air or nitrogen in the fluid and so-called "dual gradient" drilling. These methods are further described in the Background.

Other methods have been discovered to modify the fluid density within the wellbore. The inventions concern fluids which vary their density in a pre-planned and pre-engineered, designed manner for the beneficial use of extending the length of hole sections before setting casings or liners. Initially, consider a gas filled sphere or element 10 with a compliant or elastic skin 12, at least one gas-filled void 14 and a non-deformable core 16 as seen in FIGS. 1A-1C. The compliant skin 12 is such that a maximum expansion limit can be reached where the gas will not be allowed to continue expanding the gross sphere size, as shown in FIG. 1A. In one non-limiting embodiment the compliant skin may be an elastomeric polymer or rubber. The elements 10 are solids and are insoluble in the base fluid. The result of this construction is a sphere 10 in which the volume responds to external pressure. At some low pressure, the volume has reached a maximum and further reductions of external pressure will not result in an additional expansion (FIG. 1A). Also, at some upper pressure, the gas (or skin 12) will have collapsed upon the internal sphere core 16 and no longer shrinks with additional external pressure (FIG. 1C). The resulting spheres thus have a range of variable size determined by external pressure; note that FIG. 1B shows element or sphere 10 in an intermediate state between the maximum expansion state of FIG. 1A and the minimum contraction state of FIG. 1C.

It is possible to envision an alternate embodiment of the invention having no non-deformable core 16, such as the embodiment shown in FIGS. 2A-2C, where FIG. 2A shows a gas filled sphere or element 20 with a compliant or elastomeric skin 22 surrounding at least one gas-filled void 24 in its maximum expansion state. FIGS. 2B and 2C shown sphere 20 in intermediate, and minimum contraction states, respectively.

It should be kept in mind when considering this invention that a small increase in linear dimension of the element, such as an element 20, is cubed upon volumetric expansion. For instance, if the increase in internal diameter of the void 24 of element 20 from FIG. 2C to FIG. 2A is 2.5/1, the volumetric increase is over 15/1. Stated another way, the elements have an average fully expanded state or size and an average fully or completely contracted state or size, where the volume ratio of the average expanded state to average contracted state is at least 2.5, alternatively the volume ratio is at least 5, in another non-limiting embodiment the volume ratio is at least 10, in a different, non-restrictive version the volume ratio is at least 5, or alternatively the volume ratio is at least 50.

Through appropriate engineering design of the relative amounts of the spheres 10 or 20 within a drilling fluid, it is possible to have a drilling fluid that significantly changes density in response to local pressure. Other parameters that may influence the amount of density variation include the base material density of the structural elements (12, 14 and 16; or 22 and 24) and the nature of the expanding or elastic material (12 or 22) of the sphere (10 or 20, respectively). Additional important parameters in the design of the controlled compressibility fluid include the pumpability of the resulting fluid and interaction with other solid elements in the fluid such as drill cuttings, or special mud solids for filtration and/or viscosity control, e.g. gels.

It is expected that in some non-restrictive embodiments the separation of the spheres or elements from the fluid must be addressed. In a particular embodiment, the separation of mud solids from drilling muds and particles from other drilling fluids is an issue that typically is managed with active circulation and/or stirring of the mud pits or other containers. In the actual bore hole, the viscosity of the fluid phase has to be great enough that the combination of the buoyancy effect and viscosity effectively float the particle within the mud or fluid. This causes the mud or fluid to "hold" the weight or buoyancy of the particle and therein allows the composite density of the mud or fluid to reflect the nature of the combination of many elements, including the spheres and elements described herein.

More specifically the unit densities of the drilling muds herein are likely to be within a wider range than in typical muds, and apparent densities will change as a function of pressure, in one non-limiting embodiment. In some non-restrictive applications, the spheres or elements may tend to drift or sink at downhole pressures, and/or may try to float or rise in the mud tanks at the surface. These effects may affect the way that mud systems are managed, but they are not expected to be limitations on the practicality of the concept herein.

Multiple embodiments of this controlled variable density fluid are envisioned. Described above with respect to FIGS. 1 and 2, the element is given as a gas-filled sphere, 10 or 20, respectively. However, the element shape is not required to be spherical nor gas filled. In the embodiment above, the driver for the element expansion is a gas pressure. The gas does not need to be conventional air or nitrogen and may be composed of material with much higher liquefaction pressures due to the relatively high pressure encountered in sub-surface wellbore operations. Non-limiting examples of such a gas or fluid include, but are not limited to natural gases (e.g. oilfield gas) which may be selected to have a wide range of compressibility behaviors, e.g. a wide range of Z factors.

Also, the expansive driver does not need to be a gas phase, it can also be a spring link or spring-like component constructed on a micro-basis. Shown in FIGS. 3A and 3B is a schematic illustration of a cross-section of element 30 having a schematically illustrated spring component 32 within the element body 34, where the spring component 32 is attached to a piston 36 that travels between upper rail condition 37 and lower rail condition 39. It is not necessary that spring component 32 be a classic coil, leaf or wafer spring as long as it exhibits spring-like behavior, i.e. can move into an expanded configuration or contracted position under an outside influence or condition. FIG. 3A illustrates element 30 in an intermediate position, where the spring component 32 is partially expanded and piston 36 is approximately half-way between the upper rail condition 37 and lower rail condition 39. Compare FIG. 3B with FIG. 3A where in FIG. 3B the spring component 32 is fully contracted and piston 36 is against upper rail condition 37. The volume of the element 30 is decreased by $\Delta V$ as fluid 38 flows into the body 34 of element 30 in the direction of the arrow and the total decrease in volume in the system from the sum of the $\Delta V$s of each element 30 is Total $\Delta V$. Elements such as schematically illustrated in FIGS. 3A and 3B may be micro- or nanomanufactured using current and future techniques.

FIGS. 3A and 3B are also helpful tools to mathematically model the volume change ratios needed to estimate or calculate the value benefit in particular applications of the variable density fluids of the invention, for instance the changing mud density in a wellbore.

Figure 6A:
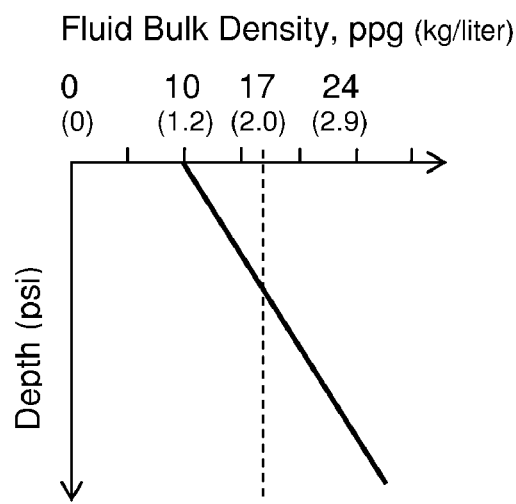
FIG. 6A is a schematic graph of fluid bulk density as a function of wellbore depth for a fluid of the invention that becomes more dense with depth, pressure, etc.

In one non-limiting embodiment of the invention, a variable density fluid containing elements such as elements 30 of this invention would behave on the surface as a 10 lb (10 lbs/gal or ppg) density fluid, that is at 0 feet of depth and 0 psi pressure (atmospheric pressure) under lower rail conditions, whereas the same fluid containing elements 30 may behave as a 24 ppg fluid at a depth of 14,000 feet and a pressure of 12,400 psi under upper rail conditions, where the composite average between the two rail conditions is about 17 ppg. A schematic graph of how the density of such a fluid would change is shown in FIG. 6A. That is, FIG. 6A is a representation of densification with depth, pressure, and/or other factors.

Figure 6B:
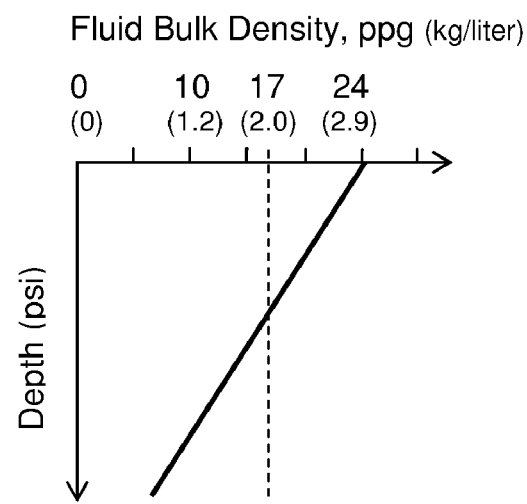
FIG. 6B is a schematic graph of fluid bulk density as a function of wellbore depth for a fluid of the invention that becomes less dense with depth, pressure, etc.

In an alternative non-limiting embodiment of the invention, the invention could be practiced in such a way, and the inventive elements may be designed in such a way that the fluid bulk density decreases with depth, pressure, and/or other factors. That is, such a fluid would become lighter or there would be "undensification" or reverse densification in response to particular conditions, as schematically illustrated in FIG. 6B.

It should also be understood that the base fluid density does not have to initially be within the range of the desired bulk density variation of the variable density fluid of this invention. The initial base fluid density may be very light or very dense. For instance, in the non-limiting case where the base fluid was very light or "super-light", e.g. a gas fluid or a foam, the variable density elements of the invention would always increase the variable bulk average density of the resulting inventive fluid to a variable value greater than that of just the base fluid. Non-limiting examples would include the use of foam or air as drilling fluids.

On the other hand, the initial base fluid may be very dense, in a non-restrictive example a "super-dense" or "super-heavy" fluid, e.g. where the base fluid has a density at or higher than the greatest incremental density desired or designed. In this case, the inventive elements would always lighten or decrease the base fluid density. Non-limiting examples include mineral separation fluids with specific gravities approaching 4 (e.g. densities of about 35 ppg or more), such as aqueous tungstenates.

Yet another configuration is to intentionally use base fluids (or blends of fluids) with high compressibilities to accomplish a portion or all of the needed fluid density variation.

The initial application for this controlled variable density is in the construction of wellbores. This includes the initial open hole drilling with drilling muds. The process of placing cement around casing and liner strings is also limited to some degree by the density of the pumped cement. The variable density spheres or elements may also be added to cement to provide improved cement placement characteristics and opportunities. The variable density elements are also expected to find utility in other sealants or sealing materials besides cements, including, but not necessarily limited to, epoxies, expansive liquids, gels, dehydrated slurries, and materials that form temporary or permanent partial or complete barriers, and the like. Other applications for fluids with variable densities may also be imagined.

An important feature of the invention is that the element changes in response to a local environmental physical parameter or condition that may vary along the length or depth or distance of the wellbore. The element is dependent upon something else that naturally changes or that the operator changes. The changes may be in the environment, in the base fluid or both. The rate at which volume will change in response to a condition such as pressure, temperature, chemical composition, or other factor can also be designed and determined in advance, based on the parameters discussed above, that is, including, but not necessarily limited to the material compositions of the elements, the physical dimensions of the elements, the properties and physical composition of the base fluid which carry the inventive elements. In some cases, the volume may drop sharply with pressure and in other cases more gradually. Instances or circumstances where the elements may change their volume/weight ratio relative to chemical composition of the environment include, but are not necessarily limited to, changes in the brine salt concentration, changes in pH, electrical properties of the fluid, and the like and combinations thereof. The elements of the inventive fluids herein may also change their volume/weight ratio in response to other properties of the fluid, including, but not necessarily limited to, electrical properties of the fluid, magnetic field, radiation (natural or induced), and the like and combinations thereof. The response to the local environment could be any of the many mechanisms mentioned herein or suggested by others, downhole or otherwise, for control of water influx via swelling or plugging of pore spaces.

Figure 4B:
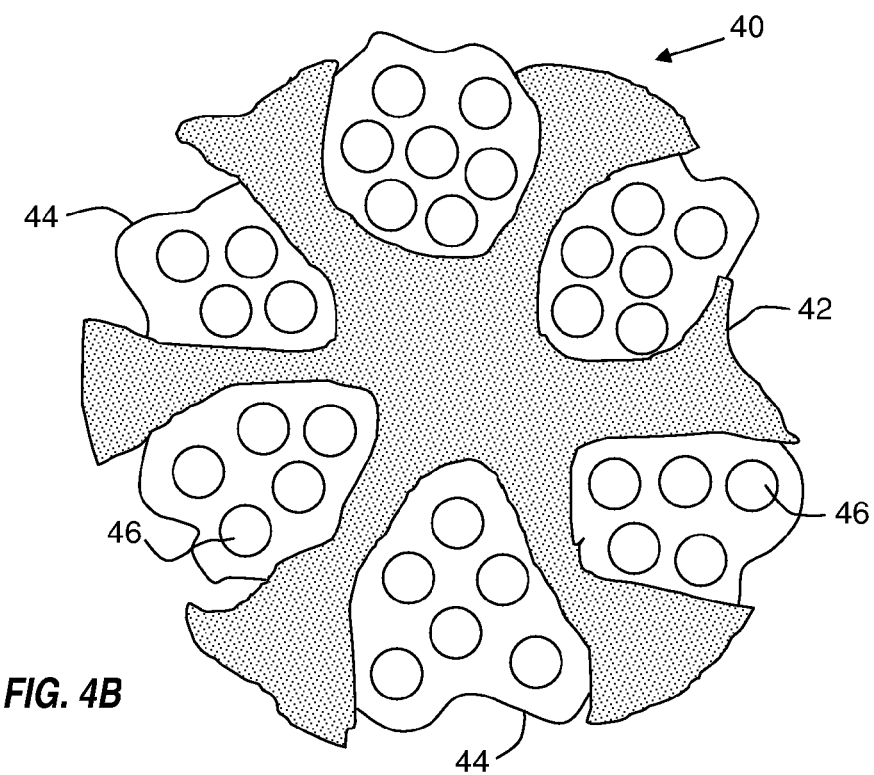
FIG. 4B is a schematic, cross-sectional illustration showing the pseudo-porous carbide particle of FIG. 4A where the cellular elastomer is in a relatively expanded state where the cells are enlarged as compared with FIG. 4B.

Yet another embodiment of the invention is schematically illustrated in cross-section in FIGS. 4A and 4B. FIG. 4A illustrates an element 40 having a pseudo-porous body 42 that is essentially non-deformable, for instance silicon carbide dust or metals or metal oxides. An important goal to the selection of the pseudo-porous body is to achieve a specific gravity core so the collapsed element behaves or acts on the system like a weighting material. These bodies 42 would have at least one cellular compliant or elastomeric component or material 44 thereon, where the individual cells 46 would not communicate with one another. For instance, in the case that material 44 is a foam, the foam would be a closed-cell elastic foam, rather than an open cell foam. Optionally, the cells may be filled with a gas, such as nitrogen, air, a noble gas, etc. Although cells 46 are illustrated as spheres, it will be understood that they need not necessarily be spherical, but may be any volumetric shape. In FIG. 4A, the cellular compliant component 44 is collapsed or contracted and cells 46 are relatively small, whereas in FIG. 4B, the cellular compliant component 44 is expanded or enlarged and the cells 46 are relatively large. In this embodiment, notice that the mean average maximum size of the element 40 essentially does not change.

Figure 5A:
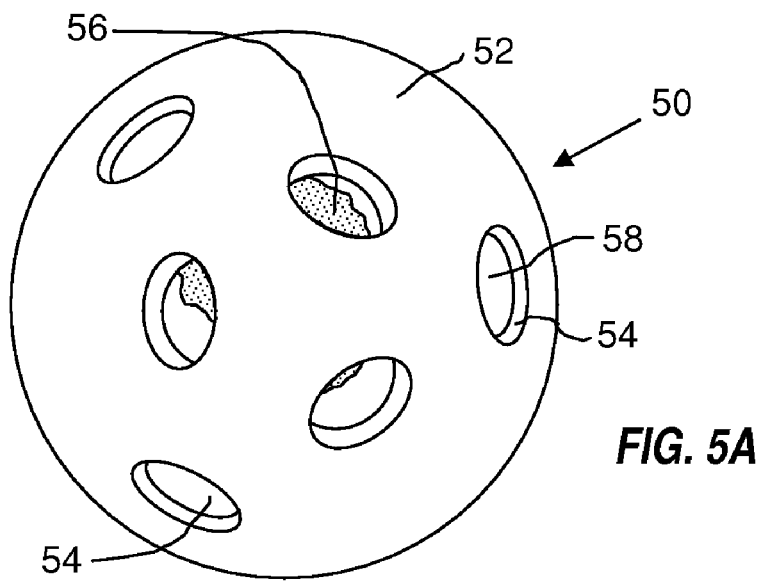
FIG. 5A is a schematic, three-quarters view of one more embodiment of the invention showing a hollow or porous shell with an inner, volume-changing material.
Figure 5B:
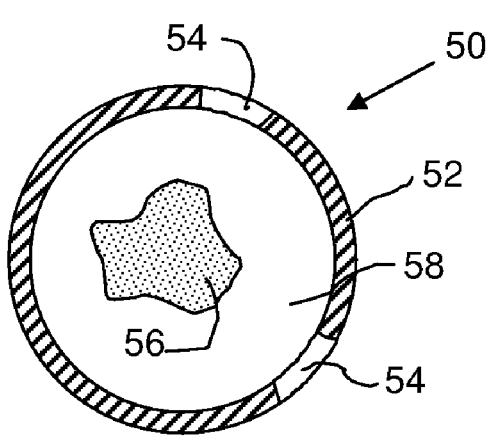
FIG. 5B is a schematic, cross-sectional illustration of the FIG. 5A embodiment where the inner, volume-changing material is in a relatively contracted state.
Figure 5C:
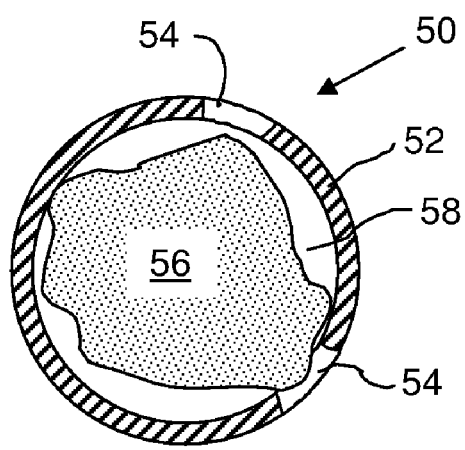
FIG. 5C is a schematic, cross-sectional illustration of the FIG. 5B embodiment where the inner, volume-changing material is in a relatively expanded state.

Still another embodiment of the invention is depicted in FIG. 5A which shows element 50 having a hollow or porous rigid external shell 52, which in very rough analogy may or may not resemble a "whiffle" ball, with at least one cavity 58 and one or more orifices or openings 54 therein between the exterior and the cavity 58. Outer structural shell 52 limits the expansion of an inner material 56 within the cavity 58 of shell 52. The inner material or "kernel" 56 provides the minimum expansion limit (FIG. 5B), while the external shell 52 defines the maximum expansion limit (FIG. 5C).

As noted, pumpability of the elements and the base fluid is a parameter to be designed in this invention, and it will be understood that the elements will be very small. In one non-limiting embodiment of this invention, the average particle size (largest dimension) of the elements is about 100 microns or less, alternatively about 75 microns or less, and in still another non-restrictive embodiment about 50 microns or less. In embodiments shown such as those in FIGS. 1 and 2 where the average element diameter changes, the initial average element diameter may be about 100 microns or less and contract or shrink to within the range of about 30-50 microns or less. Alternatively, in another non-restrictive form of the invention, the initial average element diameter may be about 70 microns or less and contract or shrink to within the range of about 25-35 microns or less. In one non-limiting embodiment of the invention, the sizes are designed to generally pass through a shaker screen and still be the approximate size of current or conventional barite grind (>325 mesh; >44 microns) when collapsed downhole. In another non-limiting embodiment these average particle sizes may be for the average contracted state size, in the case where the elements have an average contracted state size (or contracted characteristic dimension) and an average expanded state size (or expanded characteristic dimension).

It is expected that in some non-limiting embodiments of the invention certain of the elements will fail, that is will be stuck at an expanded or contracted state, that is, lose their ability to change their volume/weight ratio. Thus, it may be useful to determine a "failed case" density and size to permit simplified deletion/extraction of any failed elements from the surface mud system. This would be similar to or analogous to barite weighting agent recovery via a mud cleaner, but in this embodiment would discard the broken or failed elements.

Manufacture of the elements for the fluids of the invention, such as elements 30 of FIG. 3 can be performed using micromanufacturing or nanomanufacturing techniques, as noted. Elements 10 and 20 as seen in FIGS. 1 and 2, respectively may be produced by known and future microencapsulation methods. Elements 50 shown in FIGS. 5A-5C could be made by microencapsulation, micromanufacturing and/or nanomanufacturing processes. Elements 40 such as shown schematically in FIGS. 4A and 4B could be produced by grinding or pulverizing tungsten carbide, silicon carbide, other dense, carbide-like element or other pseudo-porous materials, infusing the particles with a dense, but microcellular polymeric elastomer, and then cryogenically grinding the elastomer down to essentially the initial size of the particles. Other possible materials for the non-deformable pseudo-porous materials besides carbide include, but are not necessarily limited to, silicon oxide (glass or sand), nanocarbon structures such as nanotubes or Buckminster fullerenes (buckyballs), and the like.

It should also be appreciated that the wellbore operation fluids of this invention may contain more than one kind of element, that is, more than one element embodiment of the invention can be employed at once. Indeed, the use of different types of elements that change their volume/weight ratio differently in response to the same conditions, or in response to different conditions would permit the fluid designer greater flexibility.

It will also be appreciated that the variable density fluids of this invention may be used in operations other than wellbore operations, as in the recovery of hydrocarbons from subterranean formations. For instance, it is expected that these variable density fluids would find utility in cementing or sealing, as drilling fluids or muds, as packer fluids, as workover fluids, as completion fluids, as drill-in fluids, or in applications where the variable density may affect the buoyancy of a body.

In one non-limiting embodiment of the invention, the elements of this invention could be used to advantage in a pseudo-gas lift operation. Generally, gas lifts are artificial-lift methods in which gas is injected into the production tubing to reduce the hydrostatic pressure of the fluid column. The resulting reduction in bottomhole pressure allows the reservoir liquids to enter the wellbore at a higher flow rate. In one non-restrictive method of the invention, the inventive elements would replace the gas, or optionally be used together with the gas, to permit reservoir fluids to flow more readily.

In this non-limiting embodiment of the invention, the lift of a produced fluid is improved by injecting into the produced fluid at a subsurface point an effective amount of a plurality of the inventive elements that change their volume/weight ratio in response to one or more of the conditions previously discussed. The volume/weight ratio of the elements would change in response to the condition giving added lift to the produced fluid by reducing its local average density. In this production embodiment of the invention, it may be desirable for the average particle size of the elements to be larger than about 100 microns for ease in removal from the produced fluid prior to further processing. In other non-limiting embodiments of the invention, the upper limits for the various average particle sizes may be about 1000 microns, on the other hand about 500 microns, alternatively about 250 microns, and in another case about 150 microns, whereas the lower limits for these average particles sizes may be about 50 microns, about 75 microns and about 100 microns.

In the foregoing specification, the invention has been described with reference to specific embodiments thereof, and has been postulated as effective in providing a wellbore operation fluid having variable density. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, additives and other components falling within the claimed parameters, but not specifically identified or tried in a particular composition, are anticipated to be within the scope of this invention.

What is claimed is:

1. A fluid of variable density comprising:
   a base fluid; and
   a plurality of elements that change their volume/weight ratio in response to a condition selected from the group consisting of pressure, temperature, and chemical composition of the base fluid, where the elements each comprise a non-deformable body and at least one cellular, compliant component each cellular, compliant component comprising at least one gas-filled void, and where the elements have an average expanded state size and an average contracted state size, and where the volume ratio of the average expanded state size to the average contracted state size is at least about 2.5.

2. The fluid of claim 1 where the average particle size of the elements is about 100 microns or less.

3. The fluid of claim 1 where the elements each comprise a non-deformable body that is pseudo-porous.

4. The fluid of claim 3 where the elements each comprise a pseudo-porous non-deformable body selected from the group consisting of tungsten carbide, silicon carbide, silicon oxide, nanocarbon structures and combinations thereof, each element including at least one cellular, compliant component that is a closed-cell elastic foam.

5. The fluid of claim 1 where the base fluid is selected from the group consisting of a wellbore operation fluid, a produced fluid and a sealant.

6. An element that changes its volume/weight ratio in response to a condition comprising:
   a non-deformable pseudo-porous body; and
   at least one closed cell compliant component comprising a gas selected from the group consisting of nitrogen, air, a noble gas, and mixtures thereof,
   where the condition is selected from the group consisting of pressure, temperature, and chemical composition of a base fluid in which the element is present, and where the largest dimension of the element is about 100 microns or less, and where the element has an expanded state size and a contracted state size, and where the volume ratio of the expanded state size to the contracted state size is at least about 2.5.

7. The element of claim 6 where the element comprises a pseudo-porous silicon non-deformable body selected from the group consisting of tungsten carbide, silicon carbide, silicon oxide, nanocarbon structures and combinations thereof, where the at least one cellular, compliant component comprises a closed-cell elastic foam.

8. The fluid of claim 1 where the at least one gas-filled void in at least one cellular, compliant component comprises a gas selected from the group consisting of nitrogen, air, a noble gas, and mixtures thereof.

* * * * *